United States Patent [19]

Shohata et al.

[11] 4,147,670

[45] Apr. 3, 1979

[54] NONOHMIC ZnO CERAMICS INCLUDING $Bi_2O_3$, CoO, MnO, $Sb_2O_3$, AND BOROSILICATE Pb AND/OR Zn GLASS COMPONENTS

[75] Inventors: Nobuaki Shohata; Tomeji Ohno; Shigeru Ikeda; Takaki Fukushima; Ryuji Igarashi; Jyun-Ichiro Yoshida, all of Tokyo, Japan

[73] Assignee: Nippon Electric Co., Ltd., Tokyo, Japan

[21] Appl. No.: 746,425

[22] Filed: Dec. 1, 1976

[30] Foreign Application Priority Data

Dec. 4, 1975 [JP] Japan ............................ 50-145332
Feb. 6, 1976 [JP] Japan ............................ 51-12640
Feb. 6, 1976 [JP] Japan ............................ 51-12642
Jun. 15, 1976 [JP] Japan ............................ 51-70133
Jun. 15, 1976 [JP] Japan ............................ 51-70134

[51] Int. Cl.² ........................................... H01B 1/08
[52] U.S. Cl. ........................................ 252/519; 106/53; 106/54; 252/518
[58] Field of Search ................... 252/519, 518; 106/53

[56] References Cited

U.S. PATENT DOCUMENTS

| | | | |
|---|---|---|---|
| 2,950,995 | 8/1960 | Place et al. ............................ | 106/53 |
| 3,598,763 | 8/1971 | Matsuoka et al. ..................... | 252/518 |
| 3,663,458 | 5/1972 | Masuyama et al. .............. | 252/519 X |
| 3,764,566 | 10/1973 | Matsuoka et al. ..................... | 252/518 |
| 3,903,226 | 9/1975 | Iga et al. .............................. | 252/519 |
| 3,962,144 | 6/1976 | Matsuura et al. ..................... | 252/519 |
| 4,041,436 | 8/1977 | Kouchich et al. ..................... | 252/519 |
| 4,046,847 | 9/1977 | Kresge ................................. | 252/519 |

OTHER PUBLICATIONS

Leiser, Importance of Lead in Glass, The Glass Industry, Oct. 1963, pp. 574–576 and 594.

*Primary Examiner*—Herbert B. Guynn
*Attorney, Agent, or Firm*—Hopgood, Calimafde, Kalil, Blaustein and Lieberman

[57] ABSTRACT

Nonohmic ZnO ceramics including the following additives have the voltage nonlinear exponent $\alpha$ of 30 or more, the dielectric constant $\epsilon$ of about 1000 or less, the loss factor (tan $\delta$) of less than 10%, and small variations caused in the breakdown voltage $V_i$ by load and large current pulses. The additives listed by molecular formulae are given in % by mol. The glass components are given for Nos. 1 through 4 in % by weight, symbols of elements being representative of borosilicate lead and/or zinc glass.

| No. | $Bi_2O_3$ | CoO | MnO | $Sb_2O_3$ | Glass Component | |
|---|---|---|---|---|---|---|
| 1. | 0.1–10 | 0.05–10 | 0.25–4 | 0.05–6 | 0.1–10 | (Pb-Zn) |
| 2. | 0.1–6 | 0.05–10 | 0.25–10 | 0.1–10 | 0.1–10 | (Zn) |
| 3. | 0.1–6 | 0.05–10 | 0.23–4 | 0.05–6 | 0.1–3 | (Pb) |
| 4. | 0.1–6 | 0.05–10 | 0.2–10 | 0.1–6 | 0.1–10 | (Zn and others) |

As a fifth embodiment, the oxides corresponding or equivalent to a lead-borosilicate glass (PbO, $B_2O_3$ and $SiO_2$) may be included in certain amounts with varying amounts of zinc oxide as a major component along with $Bi_2O_3$, CoO, MnO and $Sb_2O_3$.

16 Claims, 12 Drawing Figures

NONOHMIC ZNO CERAMICS INCLUDING BI₂O₃, COO, MNO, SB₂O₃, AND BOROSILICATE PB AND/OR ZN GLASS COMPONENTS

BACKGROUND OF THE INVENTION

This invention relates to materials of nonohmic resistors, namely, resistors having nonlinear voltage-current characteristics and, more particularly, to materials of nonohmic resistors for use in electric communication apparatus.

Nonohmic resistors (hereafter called varistors) have widely been used in surge-absorbing devices, voltage-stabilizing devices, lightning arrestors, and others. In general, a varistor is evaluated by a voltage nonlinear exponent $\alpha$ and a breakdown voltage $V_i$ used in an equation:

$$I/i = (V/V_i)^\alpha,$$

where $V_i$, named the breakdown voltage hereinabove, represents a voltage applied across the varistor to cause a predetermined current $i$ to flow therethrough and $I$ generally represents a current flowing through the varistor when a voltage $V$ is applied thereacross.

Sophisticated varistors are silicon varistors, silicon-carbide varistors, selenium rectifiers, cuprous oxide rectifiers, and the like and have various defects such that they have small voltage nonlinear exponents $\alpha$, that their characteristics are hardly optionally adjustable or controllable, and/or that they are bulky. It has recently been proposed by Michio MATSUOKA in "Japanese Journal of Applied Physics," Vol. 10, No. 6 (June 1971), pages 736-746, to provide a varistor as a sintered body or mass of zinc oxide ceramics with five additives of bismuth(III) oxide, cobalt(II) oxide, manganese(II) oxide, chromium(III) oxide, and antimony(III) oxide and to thereby remove the above-mentioned defects and widen the field of application of the varistors. The proposed varistor, however, is still unsatisfactory for use in those circuits of recent highly developed electric communication apparatus in which a varistor is mostly used with a load imposed thereon as a surge-absorbing element for absorbing a large current pulse inevitably appearing in the circuit upon on-off of a switch for the circuit and under like circumstances. Furthermore, the proposed varistor is defective in that continued application thereto of a certain electric power results in a decrease in the breakdown voltage $V_i$ and a consequent increase in the leakage current. The proposed varistor likewise when supplied repeatedly with large current pulses does not tend to retain its excellent nonohmic characteristics.

Except for specific electric circuits, the voltage nonlinear exponent $\alpha$ of a varistor should be about 30 or more. The breakdown voltage $V_i$ should be adjustable to a nominal voltage preselected for the varistor in consideration of the usage thereof. Dielectric properties are also important when a varistor is used in communication apparatus. The varistor shows a small impedance for that frequency of a signal used in communication apparatus which is rendered more and more higher with the progress of communication techniques. It is therefore desirable that a varistor has a smaller capacitance or dielectric constant $\epsilon$. It is also desired that a varistor has a smaller dielectric loss ($\tan\delta$). The conventional varistor comprising zinc oxide as its principal constituent has had as large as dielectric constant $\epsilon$ and a dielectric loss ($\tan\delta$) as about 1000 or more and 10% or more, respectively, and has been unsatisfactory for use in communication apparatus.

Proposals have also been made to render the varistors more resistive against the continued load and the large current pulses. One of the proposals is to make the varistor which consists mainly of zinc oxide to include various vitreous materials by one method or another. The improvements thereby achieved, however, have been either for the load or for the large current pulse. This proves that the mechanism of variation caused in the varistor characteristics by the load is different from the mechanism for the large current pulse and that the improvement has consequently been possible for only one of the load and the large current pulse. Furthermore, addition of the vitreous material has raised the breakdown voltage $V_i$ to about 500 volts or more. As a result, varistors for use in communication apparatus have to be rendered very thin in order to provide a compromise between the voltage of the signal used therein and the breakdown voltage so that the varistors do not further withstand a high surge voltage and that the varistors have only weak mechanical strength and unduly large capacitance.

SUMMARY OF THE INVENTION

It is therefore a general object of the present invention to provide a material for a varistor which is quite satisfactorily usable in a circuit of electric communication apparatus.

It is a specific object of this invention to provide a material for a varistor having excellent nonohmic, dielectric, load-resistive, and large current pulse-resistive characteristics.

In accordance with one embodiment of this invention, there is provided a nonohmic ceramic material consisting essentially of a main component of zinc oxide, auxiliary components of bismuth(III) oxide of 0.1-10%, cobalt(II) oxide of 0.05-10%, manganese(II) oxide of 0.25-4%, and antimony(III) oxide of 0.05-6%, the percentages being by mol, and as an additional additive borosilicate lead and zinc glass, the material including the additional components of 0.1-10% by weight.

DESCRIPTION OF THE PREFERRED EMBODIMENTS

Figures 1, 4, 7, 10:
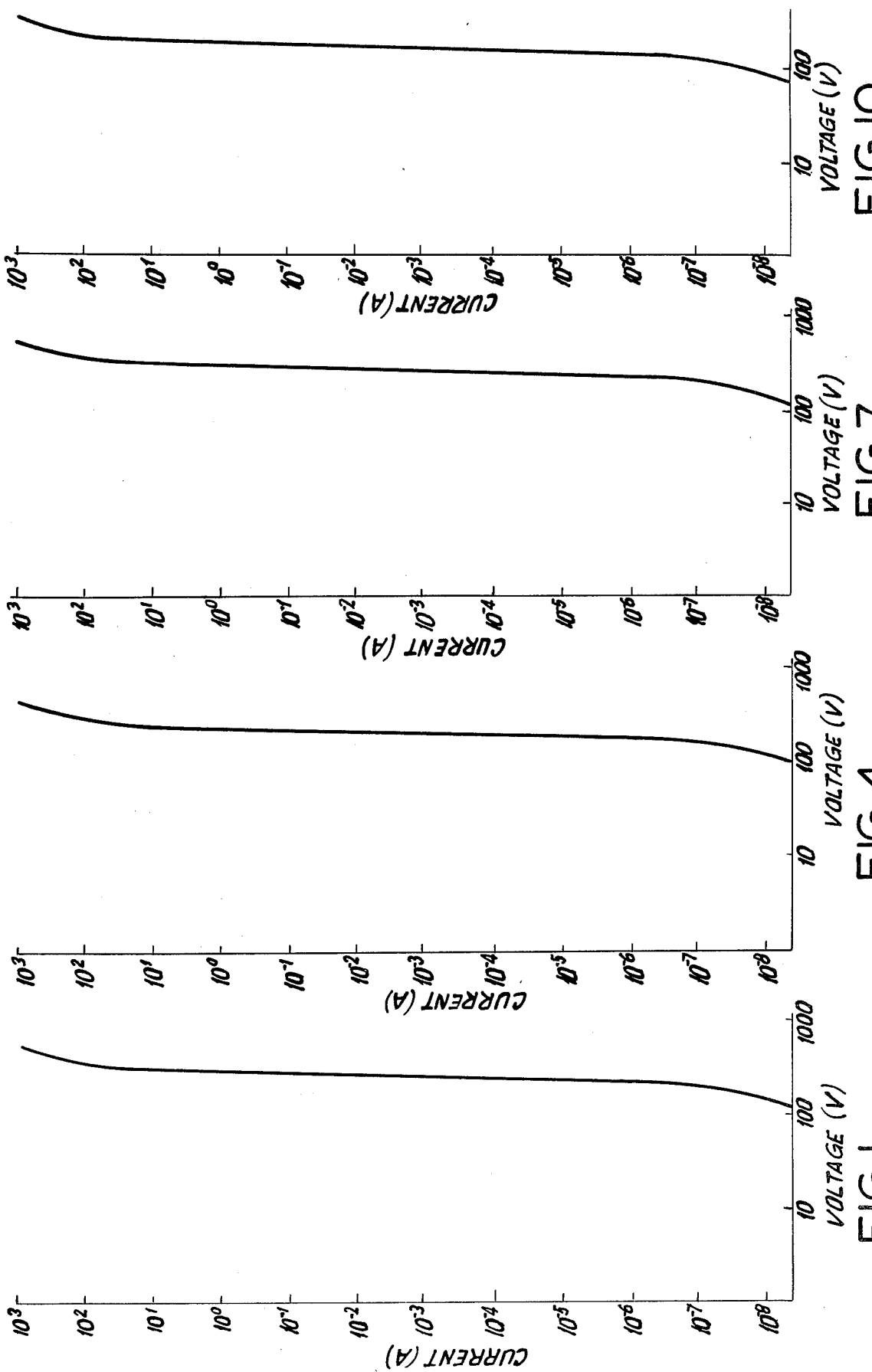
FIGS. 1 through 12 show various characteristics of nonohmic ceramic materials according to preferred embodiments of the present invention.

Nonohmic ceramic materials according to a first embodiment of the present invention consist essentially of a main component of zinc oxide, auxiliary components of 0.1-10% by mol of bismuth(III) oxide, 0.05-10% by mol of cobalt(II) oxide, 0.25-4% by mol of manganese(II) oxide, 0.05-6% by mol of antimony(III) oxide, and additional components of 0.1-10% by weight of borosilicate lead-zinc glass.

According to a second embodiment of this invention, the percentages of the bismuth, manganese, and antimony oxides are changed to 0.1-6%, 0.25-10%, and 0.1-10% by mol, respectively, with borosilicate zinc glass substituted for the borosilicate lead-zinc glass.

According to a third embodiment of this invention, use is made of the percentages of the bismuth oxide and of the other auxiliary component oxides as in the second and the first embodiments, respectively, with the additional components changed to borosilicate lead glass of 0.1–3% by weight.

According to a fourth embodiment of this invention, the percentages of the antimony oxide is changed in the second embodiment to 0.1–6% by mol with at least one of lead(II) oxide, aluminium oxide, cerium oxide, barium oxide, titanium(IV) oxide, tin(IV) oxide, tantalum(V) oxide, phosphorus pentoxide, calcium oxide, diarsenic trioxide, and zirconium(IV) oxide (except the lead oxide only) added to the borosilicate zinc glass.

According to a fifth embodiment of this invention, nonohmic ceramic materials consist essentially of a main component of zinc oxide, auxiliary components of 0.10–3.00% by mol of bismuth(III) oxide, 0.10–10.00% by mol of cobalt(II) oxide, 0.10–5.00% by mol of manganese(II) oxide, and 0.10–5.00% by mol of antimony(III) oxide, and additional components of 0.01–0.50% by mol of silicon(IV) oxide, 0.01–1.00% by mol of boron oxide, and 0.01–0.50% by mol of lead(II) oxide. It is obvious that the additional components correspond to or are equivalent to borosilicate lead glass although actual formation of the glass in the ceramics has not yet been confirmed. The ceramic materials contain from 0.03% to about 3% by weight of the additional components, namely, the borosilicate lead glass equivalent.

In addition to the properties mentioned in the preamble of the instant specification, it is necessary for a varistor that its electrodes do not exfoliate even when the varistor is subjected to repeated temperature cycles. It has been confirmed that a varistor made of any ceramic material according to the first through fifth embodiments of this invention is strong against temperature cycles.

As starting materials for varistors made of ceramic materials according to the first through fourth embodiments, use was made of powdered zinc oxide of a purity equal to 99% or higher, bismuth(III) oxide, cobalt(II) oxide, manganese(II) carbonate, antimony(III) oxide, and borosilicate lead and/or zinc glass frit. The glass frit was of various compositions listed by percentages by weight in Tables 1 and 2 hereunder. According to the fifth embodiment, use was made, in addition to the above-mentioned oxides and carbonate, of powdered silicon(IV) oxide, boron oxide, and lead(II) oxide to provide the additional components corresponding or equivalent to borosilicate lead glass. Typical percentages by mol of the additional compositions are given in Table 3 below, wherein the compositions marked with asterisks are outside of the percentages used in the fifth embodiment.

Table 1

| glass frit | $SiO_2$ | $B_2O_3$ | ZnO | PbO |
|---|---|---|---|---|
| AA | 10.8 | 27.2 | 60.0 | 2.0 |
| AB | 2.0 | 10.0 | 12.5 | 75.5 |
| AC | 9.5 | 27.0 | 63.4 | 0.1 |
| AD | 0.1 | 55.4 | 44.4 | 0.1 |
| AE | 12.0 | 23.5 | 56.0 | 8.5 |
| AF | 27.0 | 8.0 | 0.1 | 64.9 |
| AG | 72.3 | 20.7 | 0.1 | 6.9 |
| BA | 11.8 | 28.1 | 60.1 | |
| BB | 42.1 | 10.4 | 47.5 | |
| BC | 22.1 | 22.8 | 55.1 | |
| BD | 65.3 | 9.5 | 25.2 | |
| BE | 39.2 | 21.0 | 39.8 | |
| CA | 26 | 8 | | 66 |
| CB | 35 | 13 | | 52 |
| CC | 75 | 15 | | 10 |
| CD | 50 | 10 | | 40 |
| CE | 50 | 25 | | 25 |

Table 1-continued

| CF | 34 | 28 | | 38 |
|---|---|---|---|---|

Table 2

| glass frit | DA | DB | DC | DD | DE | DF |
|---|---|---|---|---|---|---|
| $SiO_2$ | 11.8 | 2.1 | 12.0 | 9.2 | 10.7 | 6.2 |
| $B_2O_3$ | 28.1 | 9.4 | 23.2 | 27.8 | 28.5 | 18.6 |
| ZnO | 60.1 | 12.3 | 52.1 | 50.4 | 50.9 | 24.1 |
| PbO | | 70.1 | 6.8 | | | 43.3 |
| $Al_2O_3$ | | 0.6 | | 0.4 | 0.2 | |
| $CeO_2$ | | 1.1 | | 3.8 | 5.1 | |
| BaO | | | 2.6 | | | 1.8 |
| $TiO_2$ | | 3.9 | | 4.1 | | |
| $SnO_2$ | | | 1.8 | | | 2.2 |
| $Ta_2O_5$ | | | | | 0.2 | 1.1 |
| $P_2O_5$ | | | 1.1 | 3.6 | | |
| CaO | | 0.2 | | | | |
| $As_2O_3$ | | 0.4 | | | | |
| $ZrO_2$ | | | | 0.7 | | 3.7 |

Table 3

| glass equivalent | $SiO_2$ | $B_2O_3$ | PbO |
|---|---|---|---|
| *EA | 0.00 | 0.30 | 0.05 |
| EB | 0.01 | " | " |
| EC | 0.05 | " | " |
| ED | 0.10 | " | " |
| EE | 0.50 | " | " |
| *EF | 1.00 | " | " |
| *EG | 0.05 | 0.00 | " |
| EH | " | 0.01 | " |
| EI | " | 0.05 | " |
| EJ | " | 0.10 | " |
| EK | " | 1.00 | " |
| *EL | " | 2.00 | " |
| *EM | " | 0.30 | 0.00 |
| EN | " | " | 0.01 |
| EO | " | " | 0.10 |
| EP | " | " | 0.50 |
| *EQ | " | " | 1.00 |

Throughout the first through fourth embodiments, the powdered oxides and carbonate were weighed out, mixed together with addition thereto of pure water in a ball mill for twenty-four hours, filtered, dried, calcined at 650° C.–850° C., and pressure-shaped into disks, 16 mm in diameter, with addition thereto of a small amount of a binder (5% aqueous solution of polyvinyl alcohol). For the fifth embodiment, weighed out powder of the oxides and carbonate of the auxiliary and additional components were mixed for two hours by the use of a grinder before the calcination. The disks were sintered at 1100° C.–1300° C. for one hour into ceramics, which were ground to a thickness of 1 mm. A pair of silver electrodes, 8 mm in diameter, were fired to each ground ceramic disk to provide a sample.

The voltage nonlinear exponent α and the breakdown voltage $V_i$ were calculated from the results of measurement of the voltage-current characteristics carried out by the use of d.c. power or pulses produced by a curve tracer. The capacitance and the loss factor (tanδ) were measured by the use of a capacitance bridge at 1 kHz. The load characteristics were evaluated by a change in the breakdown voltage $V_i$ for a current of 10 microamperes at room temperature before and after a power of 1.5 W/cm² was imposed for three hours on each sample kept at 80° C. in a thermostat. The large current pulse characteristics were similarly evaluated by a variation in the breakdown voltage $V_{10\mu A}$ before and after current pulses of 200 amperes (the current wave form being 10 × 200 microseconds) were caused to flow through each sample twenty times at an interval of 30 seconds. For use in communication apparatus, the load and the large current pulse characteristics should be about 20% and about 5%, respectively, or less. The temperature cycle test was carried out for a change in the capacitance before and after each sample was subjected fifteen times to a temperature cycle of −65° C., 25° C., 125° C., and 25° C.

Typical results are listed in Table 4 wherein $V_i$, the breakdown voltage, is given in volts for the above-mentioned samples when the current density is 1 mA/cm$^2$, tan δ, the loss factor, is given in percentage, and "L," "P," and "T" represent in percentages the load and the large current pulse characteristics and the results of temperature cycle tests, all mentioned above. Samples numbered with asterisks are not made of nonohmic ceramic materials according to the first through fifth embodiments. The temperature cycle tests were not carried out for samples made of nonohmic ceramic materials including the borosilicate lead glass equivalents listed in Table 3. For reference, similar data are shown in Table 4 for like samples made of zinc oxide ceramics including no borosilicate glass equivalent.

Table 4

| No. | ZnO | Bi$_2$O | CoO | MnO | Sb$_2$O$_3$ | glass | α | $V_i$ | ε | tan δ | L | P | T |
|---|---|---|---|---|---|---|---|---|---|---|---|---|---|
| glass: AA | | | | | | | | | | | | | |
| *1 | 95.0 | 1.0 | 1.0 | 1.0 | 2.0 | 0.05 | 45 | 260 | 800 | 10.5 | −79 | −10 | −130 |
| 2 | " | " | " | " | " | 0.1 | 48 | 245 | 770 | 7.5 | −15 | −4 | 0 |
| 3 | " | " | " | " | " | 1.0 | 61 | 267 | 637 | 3.4 | −7 | +1 | " |
| 4 | " | " | " | " | " | 3.0 | 53 | 260 | 600 | 2.8 | −10 | −2 | " |
| 5 | " | " | " | " | " | 5.0 | 46 | 252 | 553 | 3.4 | −13 | −3 | " |
| 6 | " | " | " | " | " | 10.0 | 42 | 250 | 503 | 4.6 | −18 | −5 | " |
| *7 | " | " | " | " | " | 20.0 | 43 | 250 | 500 | 7.5 | −25 | −10 | −20 |
| *8 | 96.0 | 0.0 | " | " | " | 1.0 | 7 | 163 | 698 | 30.5 | −99 | −30 | 0 |
| 9 | 95.9 | 0.1 | " | " | " | " | 40 | 283 | 585 | 8.5 | −20 | −4 | " |
| 10 | 95.6 | 0.4 | " | " | " | " | 63 | 343 | 467 | 1.6 | −15 | 0 | " |
| 11 | 92.0 | 4.0 | " | " | " | " | 39 | 161 | 912 | 8.5 | −12 | −2 | " |
| 12 | 86.0 | 10.0 | " | " | " | " | 30 | 100 | 960 | 9.5 | −19 | −4 | " |
| *13 | 76.0 | 20.0 | " | " | " | " | 15 | 100 | 970 | 20.0 | −50 | −10 | −15 |
| *14 | 96.0 | 1.0 | 0.0 | " | " | " | 60 | 360 | 430 | 5.5 | −75 | −25 | 0 |
| 15 | 95.95 | " | 0.05 | " | " | " | 82 | 350 | 499 | 3.8 | −18 | −5 | " |
| 16 | 95.6 | " | 0.4 | " | " | " | 72 | 291 | 556 | 3.5 | −15 | −3 | " |
| 17 | 92.0 | " | 4.0 | " | " | " | 65 | 256 | 598 | 2.7 | −13 | −3 | " |
| 18 | 86.0 | " | 10.0 | " | " | " | 48 | 304 | 532 | 5.2 | −19 | −5 | " |
| *19 | 76.0 | " | 20.0 | " | " | " | 40 | 300 | 530 | 5.2 | −60 | −20 | −20 |
| *20 | 96.0 | " | 1.0 | 0.0 | " | " | 40 | 194 | 1020 | 2.3 | −99 | −35 | −11 |
| 21 | 95.75 | " | " | 0.25 | " | " | 46 | 205 | 760 | 2.4 | −19 | −5 | 0 |
| 22 | 95.6 | " | " | 0.4 | " | " | 51 | 224 | 634 | 2.6 | −15 | −4 | " |
| 23 | 92.0 | " | " | 4.0 | " | " | 66 | 295 | 528 | 8.5 | −13 | −3 | " |
| *24 | 86.0 | " | " | 10.0 | " | " | 60 | 300 | 400 | 8.5 | −30 | −15 | −20 |
| *25 | 97.0 | " | " | " | 0.0 | " | 51 | 155 | 2398 | 5.9 | −99 | −32 | 0 |
| 26 | 96.75 | " | " | " | 0.05 | " | 53 | 150 | 960 | 5.5 | −20 | −4 | " |
| 27 | 96.6 | " | " | " | 0.4 | " | 53 | 150 | 730 | 5.3 | −15 | +1 | " |
| 28 | 93.0 | " | " | " | 4.0 | " | 47 | 329 | 249 | 2.6 | −12 | −2 | " |
| 29 | 91.0 | " | " | " | 6.0 | " | 40 | 350 | 198 | 8.5 | −18 | −5 | " |
| *30 | 87.0 | " | " | " | 10.0 | " | 35 | 360 | 200 | 9.0 | −30 | −15 | " |
| glass: AB | | | | | | | | | | | | | |
| *31 | 95.0 | 1.0 | 1.0 | 1.0 | 2.0 | 0.05 | 48 | 220 | 800 | 9.5 | −30 | −6 | −18 |
| 32 | " | " | " | " | " | 0.1 | 48 | 212 | 866 | 8.6 | −15 | −4 | 0 |
| 33 | " | " | " | " | " | 1.0 | 48 | 210 | 794 | 6.6 | −15 | +1 | " |
| 34 | " | " | " | " | " | 3.0 | 40 | 180 | 1100 | 9.5 | −45 | +1 | " |
| glass: AC | | | | | | | | | | | | | |
| *35 | 95.0 | 1.0 | 1.0 | 1.0 | 2.0 | 0.05 | 50 | 234 | 850 | 10.9 | −40 | −10 | −35 |
| 36 | " | " | " | " | " | 0.1 | 53 | 234 | 839 | 7.4 | −20 | −5 | 0 |
| 37 | " | " | " | " | " | 1.0 | 61 | 256 | 538 | 3.0 | −8 | +4 | " |
| 38 | " | " | " | " | " | 3.0 | 62 | 277 | 396 | 2.7 | −12 | 0 | " |
| 39 | " | " | " | " | " | 5.0 | 61 | 280 | 357 | 4.8 | −15 | −3 | " |
| 40 | " | " | " | " | " | 10.0 | 51 | 282 | 273 | 6.7 | −19 | −5 | " |
| *41 | " | " | " | " | " | 20.0 | 50 | 280 | 270 | 7.0 | −35 | −5 | −20 |
| glass: AD | | | | | | | | | | | | | |
| *42 | 93.0 | 1.0 | 1.0 | 1.0 | 2.0 | 0.05 | 42 | 275 | 900 | 7.9 | −30 | −3 | −40 |
| 43 | " | " | " | " | " | 0.1 | 44 | 280 | 880 | 6.8 | −18 | −4 | 0 |
| 44 | " | " | " | " | " | 1.0 | 40 | 285 | 850 | 8.5 | −50 | −10 | " |
| glass: AE | | | | | | | | | | | | | |
| *45 | 95.0 | 1.0 | 1.0 | 1.0 | 2.0 | 0.05 | 45 | 250 | 890 | 15.0 | −5 | −7 | −15 |
| 46 | " | " | " | " | " | 0.1 | 47 | 249 | 870 | 7.8 | −4 | −4 | 0 |
| 47 | " | " | " | " | " | 1.0 | 46 | 300 | 814 | 3.4 | −10 | −4 | " |
| 48 | " | " | " | " | " | 3.0 | 42 | 350 | 650 | 2.7 | −15 | −5 | " |
| 49 | " | " | " | " | " | 5.0 | 40 | 360 | 600 | 1.0 | −25 | −6 | " |
| glass: AF | | | | | | | | | | | | | |
| *50 | 95.0 | 1.0 | 1.0 | 1.0 | 2.0 | 0.05 | 45 | 250 | 850 | 9.0 | −40 | −4 | −13 |
| 51 | " | " | " | " | " | 0.1 | 47 | 249 | 830 | 6.7 | −13 | −4 | 0 |
| 52 | " | " | " | " | " | 1.0 | 46 | 300 | 692 | 3.1 | −15 | −2 | " |
| 53 | " | " | " | " | " | 3.0 | 42 | 350 | 520 | 2.8 | −13 | −3 | " |
| 54 | | " | " | " | " | 5.0 | 40 | 400 | 500 | 5.0 | −50 | −6 | −15 |
| glass: AG | | | | | | | | | | | | | |
| *55 | 95.0 | 1.0 | 1.0 | 1.0 | 2.0 | 0.05 | 45 | 270 | 815 | 11.0 | −45 | −20 | −20 |
| 56 | " | " | " | " | " | 0.1 | 51 | 244 | 783 | 5.0 | −19 | −5 | 0 |
| 57 | " | " | " | " | " | 1.0 | 40 | 310 | 522 | 3.9 | −12 | −5 | " |
| 58 | " | " | " | " | " | 3.0 | 37 | 380 | 440 | 2.2 | −14 | −4 | " |
| 59 | " | " | " | " | " | 5.0 | 32 | 410 | 430 | 2.7 | −18 | −2 | " |

Table 4-continued

| | | | | | | | | | | | | | |
|---|---|---|---|---|---|---|---|---|---|---|---|---|---|
| 60 | " | " | " | " | " | 10.0 | 35 | 450 | 420 | 3.5 | −36 | −15 | " |
| glass: BA | | | | | | | | | | | | | |
| 61 | 95.0 | 1.0 | 1.0 | 1.0 | 2.0 | 0.1 | 53 | 236 | 820 | 7.3 | −18 | −4 | 0 |
| 62 | " | " | " | " | " | 1.0 | 64 | 258 | 523 | 3.1 | −5 | +4 | " |
| 63 | " | " | " | " | " | 5.0 | 62 | 277 | 386 | 4.8 | −14 | −2 | " |
| 64 | " | " | " | " | " | 10.0 | 57 | 280 | 281 | 6.7 | −18 | −5 | " |
| *65 | " | " | " | " | " | 30.0 | 21 | 335 | 218 | 9.8 | −25 | −13 | |
| *66 | 96.0 | 0.0 | " | " | " | 1.0 | 5 | 79 | 8320 | 11.7 | −92 | −39 | |
| 67 | 95.9 | 0.1 | " | " | " | " | 34 | 204 | 469 | 2.4 | −16 | −4 | 0 |
| 68 | 95.6 | 0.4 | " | " | " | " | 57 | 318 | 318 | 2.0 | −7 | +2 | " |
| 69 | 90.0 | 6.0 | " | " | " | " | 58 | 196 | 589 | 7.6 | −13 | −3 | " |
| *70 | 86.0 | 10.0 | " | " | " | " | 4 | 72 | 2160 | 28.8 | −26 | −7 | |
| 71 | 96.0 | 1.0 | 0.05 | " | " | " | 71 | 415 | 312 | 2.6 | −19 | −5 | 0 |
| 72 | 95.6 | " | 0.4 | " | " | " | 62 | 304 | 418 | 2.7 | −7 | −5 | " |
| 73 | 92.0 | " | 4.0 | " | " | " | 52 | 234 | 520 | 2.3 | −11 | +1 | " |
| 74 | 86.0 | " | 10.0 | " | " | " | 41 | 276 | 578 | 4.6 | −17 | −2 | " |
| *75 | 66.0 | " | 30.0 | " | " | " | 35 | 328 | 677 | 7.2 | −24 | −4 | |
| *76 | 96.0 | " | 1.0 | 0.0 | " | " | 45 | 154 | 1080 | 2.4 | −8 | −6 | |
| 77 | 95.75 | " | " | 0.25 | " | " | 47 | 198 | 530 | 2.1 | −4 | −3 | 0 |
| 78 | 92.0 | " | " | 4.0 | " | " | 57 | 271 | 482 | 6.5 | −7 | 0 | " |
| 79 | 86.0 | " | " | 10.0 | " | " | 43 | 309 | 512 | 7.8 | −14 | −2 | " |
| *80 | 66.0 | " | " | 30.0 | " | " | 32 | 344 | 883 | 18.9 | −24 | −4 | |
| *81 | 97.0 | " | " | 1.0 | 0.0 | " | 51 | 146 | 2430 | 5.2 | −26 | −4 | |
| 82 | 96.9 | " | " | " | 0.1 | " | 55 | 147 | 840 | 4.7 | −19 | −2 | 0 |
| 83 | 93.0 | " | " | " | 4.0 | " | 52 | 288 | 470 | 3.1 | −6 | 0 | " |
| 84 | 87.0 | " | " | " | 10.0 | " | 44 | 343 | 258 | 2.4 | −4 | −2 | " |
| *85 | 67.0 | " | " | " | 30.0 | " | 18 | 983 | 80 | 20.6 | −15 | −5 | |
| glass: BB | | | | | | | | | | | | | |
| 86 | 95.0 | 1.0 | 1.0 | 1.0 | 2.0 | 0.1 | 48 | 246 | 770 | 6.8 | −11 | −5 | 0 |
| 87 | " | " | " | " | " | 1.0 | 53 | 268 | 652 | 3.5 | −7 | +2 | " |
| 88 | " | " | " | " | " | 5.0 | 47 | 254 | 633 | 3.2 | −12 | 0 | " |
| 89 | " | " | " | " | " | 10.0 | 41 | 273 | 576 | 4.9 | −15 | −3 | " |
| *90 | " | " | " | " | " | 30.0 | 27 | 432 | 372 | 8.8 | −22 | −9 | |
| glass: BC | | | | | | | | | | | | | |
| 91 | 95.0 | 1.0 | 1.0 | 1.0 | 2.0 | 0.1 | 49 | 248 | 788 | 7.1 | −15 | −2 | 0 |
| 92 | " | " | " | " | " | 1.0 | 60 | 261 | 486 | 3.0 | −6 | +2 | " |
| 93 | " | " | " | " | " | 5.0 | 58 | 267 | 431 | 3.1 | −7 | 0 | " |
| 94 | " | " | " | " | " | 10.0 | 46 | 258 | 440 | 6.2 | −11 | −4 | " |
| *95 | " | " | " | " | " | 30.0 | 41 | 249 | 451 | 10.4 | −19 | −11 | |
| glass: BD | | | | | | | | | | | | | |
| 96 | 95.0 | 1.0 | 1.0 | 1.0 | 2.0 | 0.1 | 44 | 224 | 743 | 5.9 | −14 | −2 | 0 |
| 97 | " | " | " | " | " | 1.0 | 47 | 218 | 421 | 2.7 | −9 | 0 | " |
| 98 | " | " | " | " | " | 5.0 | 41 | 198 | 443 | 3.4 | −11 | −3 | " |
| 99 | " | " | " | " | " | 10.0 | 38 | 187 | 451 | 4.7 | −15 | −5 | " |
| *100 | " | " | " | " | " | 30.0 | 32 | 234 | 388 | 9.6 | −23 | −9 | |
| glass: BE | | | | | | | | | | | | | |
| 101 | 95.0 | 1.0 | 1.0 | 1.0 | 2.0 | 0.1 | 51 | 268 | 610 | 6.1 | −13 | −5 | 0 |
| 102 | " | " | " | " | " | 1.0 | 63 | 252 | 453 | 3.3 | −7 | −3 | " |
| 103 | " | " | " | " | " | 5.0 | 62 | 248 | 399 | 3.6 | −8 | −2 | " |
| 104 | " | " | " | " | " | 10.0 | 54 | 255 | 432 | 4.9 | −11 | −4 | " |
| *105 | " | " | " | " | " | 30.0 | 42 | 261 | 484 | 7.5 | −18 | −21 | |
| glass: CA | | | | | | | | | | | | | |
| 106 | 95.0 | 1.0 | 1.0 | 1.0 | 2.0 | 0.1 | 57 | 267 | 610 | 4.6 | −14 | −3 | 0 |
| 107 | " | " | " | " | " | 1.0 | 55 | 320 | 262 | 2.6 | −16 | 0 | " |
| 108 | " | " | " | " | " | 3.0 | 41 | 363 | 198 | 2.7 | −19 | −4 | " |
| *109 | " | " | " | " | " | 5.0 | 36 | 415 | 164 | 2.9 | −38 | −16 | |
| *110 | " | " | " | " | " | 10.0 | 23 | 432 | 123 | 4.7 | −75 | −48 | |
| *111 | 96.0 | 0.0 | " | " | " | 0.1 | 3 | 56 | 3892 | 30.6 | −98 | −34 | |
| 112 | 95.9 | 0.1 | " | " | " | " | 31 | 240 | 573 | 7.8 | −19 | −4 | 0 |
| 113 | 95.6 | 0.4 | " | " | " | " | 49 | 386 | 343 | 2.5 | −17 | −2 | " |
| 114 | 92.0 | 4.0 | " | " | " | " | 46 | 284 | 582 | 6.7 | −19 | −3 | " |
| 115 | 90.0 | 6.0 | " | " | " | " | 43 | 252 | 566 | 7.4 | −20 | −5 | " |
| *116 | 86.0 | 10.0 | " | " | " | " | 41 | 234 | 632 | 11.5 | −48 | −20 | |
| *117 | 96.0 | 1.0 | 0.0 | " | " | " | 38 | 343 | 398 | 4.6 | −84 | −26 | |
| 118 | 95.95 | " | 0.05 | " | " | " | 39 | 323 | 432 | 3.9 | −20 | −5 | 0 |
| 119 | 95.6 | " | 0.4 | " | " | " | 37 | 315 | 475 | 3.4 | −16 | −3 | " |
| 120 | 92.0 | " | 4.0 | " | " | " | 44 | 289 | 534 | 2.2 | −15 | −4 | " |
| 121 | 86.0 | " | 10.0 | " | " | " | 36 | 287 | 538 | 6.6 | −19 | −5 | " |
| *122 | 96.0 | " | 1.0 | 0.0 | " | " | 4 | 124 | 1493 | 2.8 | −99 | −35 | |
| 123 | 95.75 | " | " | 0.25 | " | " | 31 | 205 | 837 | 2.4 | −20 | −4 | 0 |
| 124 | 95.6 | " | " | 0.4 | " | " | 34 | 405 | 215 | 1.9 | −15 | −4 | " |
| 125 | 92.0 | " | " | 4.0 | " | " | 33 | 344 | 373 | 4.1 | −17 | −5 | " |
| *126 | 86.0 | " | " | 10.0 | " | " | 18 | 291 | 540 | 32.2 | −49 | −12 | |
| *127 | 97.0 | " | " | 1.0 | 0.0 | " | 18 | 163 | 1184 | 3.5 | −99 | −31 | |
| 128 | 96.95 | " | " | " | 0.05 | " | 30 | 274 | 608 | 3.2 | −20 | −4 | 0 |
| 129 | 96.6 | " | " | " | 0.4 | " | 34 | 332 | 429 | 2.4 | −17 | −3 | " |
| 130 | 93.0 | " | " | " | 4.0 | " | 33 | 304 | 498 | 5.6 | −14 | −2 | " |
| 131 | 91.0 | " | " | " | 6.0 | " | 31 | 300 | 529 | 7.3 | −19 | −5 | " |
| *132 | 87.0 | " | " | " | 10.0 | " | 4 | 145 | 1321 | 26.4 | −66 | −21 | |
| glass: CB | | | | | | | | | | | | | |
| 133 | 95.0 | 1.0 | 1.0 | 1.0 | 2.0 | 0.1 | 48 | 254 | 743 | 6.7 | −15 | −4 | 0 |

Table 4-continued

| No. | ZnO | Bi$_2$O$_3$ | CoO | MnO | Sb$_2$O$_3$ | [glass] | α | V$_i$ | ε | tanδ | L | P |
|---|---|---|---|---|---|---|---|---|---|---|---|---|
| 134 | " | " | " | " | " | 1.0 | 51 | 325 | 705 | 3.2 | −17 | +1 | " |
| 135 | " | " | " | " | " | 3.0 | 38 | 375 | 517 | 2.8 | −20 | −5 | " |
| *136 | " | " | " | " | " | 5.0 | 27 | 443 | 508 | 2.6 | −32 | −18 | |
| *137 | " | " | " | " | " | 10.0 | 21 | 472 | 342 | 9.7 | −76 | −43 | | glass: CC

| 138 | 95.0 | 1.0 | 1.0 | 1.0 | 2.0 | 0.1 | 47 | 252 | 774 | 5.2 | −17 | −1 | 0 |
| 139 | " | " | " | " | " | 1.0 | 40 | 330 | 472 | 4.1 | −18 | +2 | " |
| 140 | " | " | " | " | " | 3.0 | 33 | 420 | 437 | 2.9 | −20 | −3 | " | glass: CD

| 141 | 95.0 | 1.0 | 1.0 | 1.0 | 2.0 | 0.1 | 48 | 257 | 730 | 6.3 | −16 | −2 | 0 |
| 142 | " | " | " | " | " | 1.0 | 47 | 298 | 395 | 2.9 | −17 | −1 | " |
| 143 | " | " | " | " | " | 3.0 | 33 | 368 | 304 | 2.7 | −20 | −4 | " |
| *144 | " | " | " | " | " | 5.0 | 24 | 439 | 273 | 3.4 | −43 | −14 | | glass: CE

| 145 | 95.0 | 1.0 | 1.0 | 1.0 | 2.0 | 0.1 | 48 | 263 | 701 | 5.8 | −17 | −1 | 0 |
| 146 | " | " | " | " | " | 1.0 | 45 | 346 | 332 | 3.9 | −19 | −3 | " |
| 147 | " | " | " | " | " | 3.0 | 39 | 412 | 243 | 2.5 | −20 | −5 | " |
| *148 | " | " | " | " | " | 5.0 | 29 | 464 | 198 | 3.2 | −58 | −21 | | glass: CF

| 149 | 95.0 | 1.0 | 1.0 | 1.0 | 2.0 | 0.1 | 51 | 257 | 723 | 6.4 | −18 | 0 | 0 |
| 150 | " | " | " | " | " | 1.0 | 44 | 284 | 349 | 3.3 | −18 | +1 | " |
| 151 | " | " | " | " | " | 3.0 | 36 | 323 | 256 | 2.6 | −20 | −5 | " |
| *152 | " | " | " | " | " | 5.0 | 31 | 365 | 204 | 3.1 | −57 | −14 | | glass: DA

| 153 | 95.0 | 1.0 | 1.0 | 1.0 | 2.0 | 0.1 | 53 | 236 | 820 | 7.3 | −18 | −4 | 0 |
| 154 | " | " | " | " | " | 1.0 | 64 | 258 | 523 | 3.1 | −5 | +4 | " |
| 155 | " | " | " | " | " | 5.0 | 62 | 277 | 386 | 4.8 | −14 | −2 | " |
| 156 | " | " | " | " | " | 10.0 | 57 | 280 | 281 | 6.7 | −18 | −5 | " |
| *157 | " | " | " | " | " | 30.0 | 21 | 335 | 218 | 9.8 | −25 | −13 | | glass: DB

| 158 | 95.0 | 1.0 | 1.0 | 1.0 | 2.0 | 0.1 | 51 | 198 | 793 | 6.5 | −16 | −3 | 0 |
| 159 | " | " | " | " | " | 1.0 | 62 | 196 | 703 | 2.8 | −6 | +2 | " |
| 160 | " | " | " | " | " | 5.0 | 56 | 198 | 722 | 2.2 | −9 | −1 | " |
| 161 | " | " | " | " | " | 10.0 | 43 | 197 | 800 | 4.1 | −16 | −2 | " |
| *162 | " | " | " | " | " | 30.0 | 37 | 196 | 845 | 4.9 | −21 | −7 | |
| *163 | 96.0 | 0.0 | " | " | " | 1.0 | 6 | 85 | 984 | 46.5 | −96 | −28 | |
| 164 | 95.9 | 0.1 | " | " | " | " | 45 | 176 | 866 | 8.6 | −18 | −5 | 0 |
| 165 | 95.6 | 0.4 | " | " | " | " | 58 | 198 | 721 | 4.1 | −7 | +3 | " |
| 166 | 90.0 | 6.0 | " | " | " | " | 42 | 165 | 878 | 6.9 | −14 | −1 | " |
| *167 | 86.0 | 10.0 | " | " | " | " | 36 | 142 | 904 | 9.1 | −28 | −6 | |
| *168 | 96.0 | 1.0 | 0.0 | " | " | " | 76 | 244 | 752 | 26.2 | −88 | −5 | |
| 169 | 95.95 | " | 0.05 | " | " | " | 68 | 196 | 737 | 7.6 | −19 | −3 | 0 |
| 170 | 95.6 | " | 0.4 | " | " | " | 62 | 192 | 728 | 5.3 | −4 | −2 | " |
| 171 | 92.0 | " | 4.0 | " | " | " | 54 | 189 | 745 | 6.6 | −2 | −2 | " |
| 172 | 86.0 | " | 10.0 | " | " | " | 41 | 198 | 796 | 9.4 | −11 | −4 | " |
| *173 | 96.0 | " | 1.0 | 0.0 | " | " | 38 | 181 | 894 | 10.2 | −17 | −6 | |
| 174 | 95.95 | " | " | 0.25 | " | " | 45 | 183 | 875 | 6.3 | −8 | −3 | 0 |
| 175 | 95.6 | " | " | 0.4 | " | " | 53 | 186 | 798 | 4.8 | −4 | −2 | " |
| 176 | 92.0 | " | " | 4.0 | " | " | 62 | 199 | 730 | 3.6 | −2 | +1 | " |
| 177 | 86.0 | " | " | 10.0 | " | " | 41 | 197 | 738 | 7.1 | −14 | −4 | " |
| 178 | 96.9 | " | " | 1.0 | 0.1 | " | 46 | 174 | 698 | 5.4 | −19 | −3 | " |
| 179 | 96.6 | " | " | " | 0.4 | " | 53 | 187 | 743 | 5.2 | −8 | −2 | |
| 180 | 96.0 | " | " | " | 1.0 | " | 61 | 196 | 706 | 4.8 | −5 | +1 | " |
| 181 | 91.0 | " | " | " | 6.0 | " | 43 | 199 | 702 | 5.4 | −9 | −3 | " |
| *182 | 87.0 | " | " | " | 10.0 | " | 10 | 243 | 565 | 7.9 | −12 | −6 | | glass: DC

| 183 | 95.0 | 1.0 | 1.0 | 1.0 | 2.0 | 0.1 | 44 | 199 | 689 | 7.8 | −4 | −4 | 0 |
| 184 | " | " | " | " | " | 1.0 | 48 | 192 | 714 | 3.7 | −6 | −3 | " |
| 185 | " | " | " | " | " | 5.0 | 45 | 189 | 746 | 2.7 | −8 | −4 | " |
| 186 | " | " | " | " | " | 10.0 | 42 | 198 | 702 | 4.1 | −15 | −5 | " |
| *187 | " | " | " | " | " | 30.0 | 38 | 220 | 670 | 8.8 | −23 | −7 | | glass: DD

| 188 | 95.0 | 1.0 | 1.0 | 1.0 | 2.0 | 0.1 | 47 | 198 | 700 | 6.5 | −10 | −3 | 0 |
| 189 | " | " | " | " | " | 1.0 | 46 | 197 | 704 | 4.2 | −5 | +2 | " | glass: DE

| 190 | 95.0 | 1.0 | 1.0 | 1.0 | 2.0 | 0.1 | 50 | 196 | 756 | 8.5 | −7 | −3 | 0 |
| 191 | " | " | " | " | " | 1.0 | 51 | 199 | 774 | 4.3 | −4 | +1 | " |
| 192 | " | " | " | " | " | 5.0 | 47 | 198 | 721 | 3.8 | −8 | −2 | | glass: DF

| 193 | 95.0 | 1.0 | 1.0 | 1.0 | 2.0 | 0.1 | 48 | 198 | 764 | 7.4 | −14 | −4 | 0 |
| 194 | " | " | " | " | " | 1.0 | 54 | 199 | 748 | 4.5 | −7 | +1 | " |
| 195 | " | " | " | " | " | 5.0 | 51 | 197 | 776 | 3.1 | −3 | −2 | " |
| 196 | " | " | " | " | " | 10.0 | 47 | 192 | 802 | 5.2 | −4 | −4 | " |
| *197 | " | " | " | " | " | 30.0 | 42 | 186 | 854 | 6.3 | −8 | −8 | | glass equivalents: E series

| No. | ZnO | Bi$_2$O$_3$ | CoO | MnO | Sb$_2$O$_3$ | [glass] | α | V$_i$ | ε | tanδ | L | P |
|---|---|---|---|---|---|---|---|---|---|---|---|---|
| *198 | 94.63 | 1.00 | 1.00 | 1.00 | 2.00 | EA | 45 | 221 | 715 | 8.0 | −25.2 | −5.5 |
| 199 | 94.64 | " | " | " | " | EB | 50 | 225 | 710 | 6.0 | −15.1 | −3.5 |
| *200 | 95.55 | 0.05 | " | " | " | EC | 5 | 112 | 500 | 2.5 | — | — |
| 201 | 95.50 | 0.10 | " | " | " | " | 48 | 140 | 450 | 2.3 | −12.2 | −4.5 |

Table 4-continued

| No | ZnO | Bi₂O₃ | CoO | MnO | Sb₂O₃ | α | $V_i$ | ε | tanδ | L | P |
|---|---|---|---|---|---|---|---|---|---|---|---|
| 202 | 94.60 | 1.00 | " | " | " | " | 58 | 227 | 700 | 2.0 | −16.1 | −3.2 |
| 203 | 92.60 | 3.00 | " | " | " | " | 55 | 175 | 710 | 1.8 | −18.3 | −4.6 |
| *204 | 90.60 | 5.00 | " | " | " | " | 45 | 160 | 715 | 8.5 | −35.4 | −15.3 |
| *205 | 95.60 | 1.00 | 0.00 | " | " | " | 46 | 282 | 720 | 6.5 | −25.8 | −6.2 |
| 206 | 95.50 | " | 0.10 | " | " | " | 52 | 264 | 710 | 2.0 | −15.2 | −5.0 |
| 207 | 85.60 | " | 10.00 | " | " | " | 55 | 234 | 705 | 2.1 | −16.3 | −4.0 |
| *208 | 75.00 | " | 20.00 | " | " | " | 50 | 372 | 700 | 2.4 | −14.7 | −18.5 |
| *209 | 95.60 | " | 1.00 | 0.00 | " | " | 38 | 200 | 710 | 2.3 | −25.6 | −15.4 |
| 210 | 95.50 | " | " | 0.10 | " | " | 50 | 189 | 710 | 2.4 | −13.5 | −4.5 |
| 211 | 92.60 | " | " | 3.00 | " | " | 60 | 245 | 700 | 2.5 | −14.5 | −3.5 |
| 212 | 90.60 | " | " | 5.00 | " | " | 62 | 250 | 710 | 4.8 | −15.5 | −4.5 |
| *213 | 85.60 | " | " | 10.00 | " | " | 58 | 264 | 715 | 8.8 | −31.2 | −10.3 |
| *214 | 96.60 | " | " | " | 1.00 | 0.00 | 43 | 178 | 2500 | 3.5 | −48.9 | −15.4 |
| 215 | 96.50 | " | " | " | " | 0.10 | 55 | 175 | 785 | 3.4 | −13.4 | −4.5 |
| 216 | 91.60 | " | " | " | " | 5.00 | 58 | 275 | 701 | 3.0 | −17.5 | −3.3 |
| *217 | 85.60 | " | " | " | " | 10.00 | 15 | 1200 | 200 | 10.5 | — | −8.0 |
| 218 | 94.55 | " | " | " | " | 2.00 | ED | 51 | 227 | 700 | 4.0 | −16.0 | −3.6 |
| 219 | 94.15 | " | " | " | " | " | EE | 52 | 284 | 682 | 1.0 | −18.1 | −4.2 |
| *220 | 93.65 | " | " | " | " | " | EF | 45 | 300 | 505 | 2.5 | −25.3 | −4.4 |
| *221 | 94.90 | " | " | " | " | " | EG | 39 | 225 | 710 | 6.5 | −35.5 | −10.5 |
| 222 | 94.89 | " | " | " | " | " | EH | 50 | 226 | 650 | 5.2 | −18.0 | −3.5 |
| 223 | 94.85 | " | " | " | " | " | EI | 55 | 224 | 603 | 1.0 | −19.0 | −3.4 |
| 224 | 94.80 | " | " | " | " | " | EJ | 54 | 226 | 610 | 0.5 | −18.2 | −3.6 |
| 225 | 93.90 | " | " | " | " | " | EK | 53 | 220 | 612 | 1.5 | −16.1 | −4.5 |
| *226 | 92.90 | " | " | " | " | " | EL | 33 | 205 | 751 | 2.0 | −14.0 | −9.8 |
| *227 | 94.65 | " | " | " | " | " | EM | 45 | 225 | 753 | 3.5 | −12.0 | −10.5 |
| 228 | 94.64 | " | " | " | " | " | EN | 56 | 219 | 724 | 2.4 | −16.0 | −3.5 |
| 229 | 94.55 | " | " | " | " | " | EO | 57 | 218 | 702 | 1.0 | −12.2 | −3.7 |
| 230 | 94.15 | " | " | " | " | " | EP | 50 | 180 | 701 | 1.0 | −15.3 | −3.9 |
| *231 | 93.65 | " | " | " | " | " | EQ | 42 | 160 | 684 | 2.5 | −40.1 | −5.5 | without glass or glass equivalent

| No | ZnO | Bi₂O₃ | CoO | MnO | Sb₂O₃ | α | $V_i$ | ε | tanδ | L | P |
|---|---|---|---|---|---|---|---|---|---|---|---|
| 232 | 95.0 | 1.0 | 1.0 | 1.0 | 2.0 | 42 | 270 | 880 | 12.0 | −98 | −28 |
| 233 | " | " | " | " | " | 45 | 220 | 712 | 8.5 | −85.0 | −20.5 |
| 234 | 96.0 | 0.0 | 1.0 | 1.0 | 2.0 | 3 | 56 | 3950 | 35.6 | −89.5 | −38.5 |
| 235 | 95.95 | 0.05 | " | " | " | 20 | 110 | 510 | 30.1 | — | — |
| 236 | 95.9 | 0.1 | " | " | " | 42 | 202 | 650 | 10.1 | −80.3 | −30.2 |
| 237 | 95.6 | 0.4 | " | " | " | 40 | 195 | 660 | 12.1 | −79.5 | −33.4 |
| 238 | 95.5 | 0.5 | " | " | " | 43 | 214 | 703 | 10.2 | −90.4 | −34.5 |
| 239 | 93.0 | 3.0 | " | " | " | 46 | 200 | 724 | 8.0 | −95.0 | −25.4 |
| 240 | 92.0 | 4.0 | " | " | " | 43 | 205 | 730 | 8.1 | −91.2 | −28.6 |
| 241 | 91.0 | 5.0 | " | " | " | 40 | 210 | 732 | 8.2 | −84.0 | −30.5 |
| 242 | 90.0 | 6.0 | " | " | " | 38 | 198 | 725 | 8.9 | −88.5 | −32.6 |
| 243 | 96.0 | 1.0 | 0.0 | " | " | 35 | 345 | 506 | 8.9 | −88.9 | −33.5 |
| 244 | 95.95 | " | 0.05 | " | " | 45 | 405 | 748 | 8.5 | −76.5 | −20.6 |
| 245 | 95.9 | " | 0.1 | " | " | 40 | 350 | 734 | 8.4 | −84.6 | −30.5 |
| 246 | 95.6 | " | 0.4 | " | " | 33 | 270 | 705 | 7.5 | −93.5 | −32.4 |
| 247 | 95.5 | " | 0.5 | " | " | 30 | 250 | 722 | 7.8 | −95.4 | −32.5 |
| 248 | 92.0 | " | 4.0 | " | " | 32 | 265 | 718 | 8.0 | −76.5 | −45.6 |
| 249 | 91.0 | " | 5.0 | " | " | 35 | 234 | 695 | 7.2 | −90.4 | −20.2 |
| 250 | 86.0 | " | 10.0 | " | " | 42 | 243 | 680 | 7.6 | −93.2 | −35.8 |
| 251 | 76.0 | " | 20.0 | " | " | 43 | 241 | 698 | 7.2 | −76.5 | −33.3 |
| 252 | 66.0 | " | 30.0 | " | " | 41 | 275 | 710 | 8.0 | −78.5 | −23.5 |
| 253 | 96.0 | " | 1.0 | 0.0 | " | 4 | 185 | 1005 | 1.5 | −89.5 | −33.8 |
| 254 | 95.9 | " | " | 0.1 | " | 33 | 210 | 812 | 4.6 | −83.0 | −43.5 |
| 255 | 95.75 | " | " | 0.25 | " | 35 | 195 | 715 | 13.9 | −88.5 | −32.5 |
| 256 | 95.6 | " | " | 0.4 | " | 34 | 302 | 702 | 15.5 | −87.6 | −29.8 |
| 257 | 93.0 | " | " | 3.0 | " | 43 | 273 | 703 | 8.8 | −76.0 | −30.4 |
| 258 | 92.0 | " | " | 4.0 | " | 33 | 300 | 650 | 10.6 | −89.5 | −33.5 |
| 259 | 91.0 | " | " | 5.0 | " | 35 | 305 | 670 | 10.6 | −90.5 | −34.1 |
| 260 | 86.0 | " | " | 10.0 | " | 34 | 324 | 701 | 12.4 | −83.5 | −41.0 |
| 261 | 97.0 | " | " | 1.0 | 0.0 | 15 | 154 | 2009 | 18.6 | −78.8 | −32.1 |
| 262 | 96.95 | " | " | " | 0.05 | 31 | 143 | 2004 | 13.6 | −98.0 | −38.2 |
| 263 | 96.9 | " | " | " | 0.1 | 33 | 215 | 730 | 14.3 | −90.0 | −36.2 |
| 264 | 96.6 | " | " | " | 0.4 | 32 | 204 | 715 | 18.5 | −79.5 | −31.5 |
| 265 | 96.0 | " | " | " | 1.0 | 31 | 205 | 715 | 19.0 | −80.5 | −31.2 |
| 266 | 93.0 | " | " | " | 4.0 | 30 | 211 | 713 | 19.6 | −83.4 | −30.8 |
| 267 | 92.0 | " | " | " | 5.0 | 32 | 220 | 724 | 17.8 | −80.5 | −31.7 |
| 268 | 91.0 | " | " | " | 6.0 | 25 | 245 | 703 | 13.4 | −93.6 | −34.6 |
| 269 | 87.0 | " | " | " | 10.0 | 4 | 740 | 653 | 10.5 | −88.5 | −32.8 |

In the above-given Table 4, samples Nos. 232 and 233 are of the same composition and yet showed different results because of the different ambient temperatures. The result of temperature cycle test for the sample No. 232 was −50%.

Referring to FIG. 1, the current-voltage characteristic of sample No. 2 is excellent for a wide range of current. The characteristic is excellent particularly with respect to small leakage current in the smaller current range.

Figure 2:
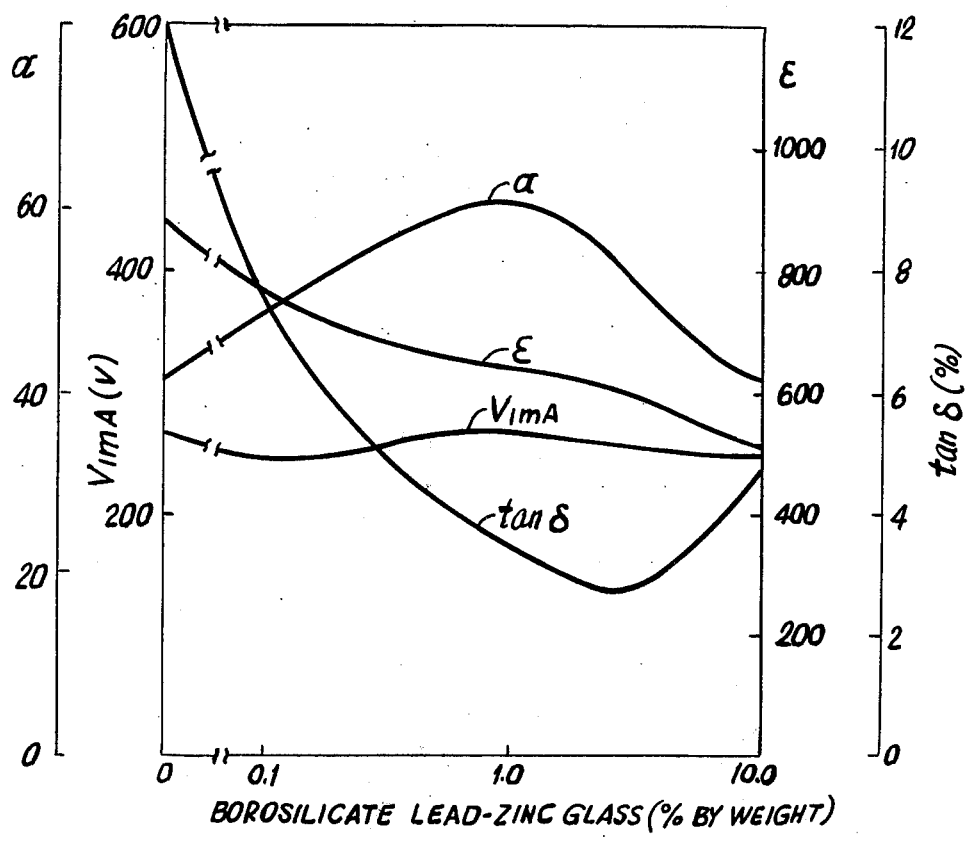
Figure 3:
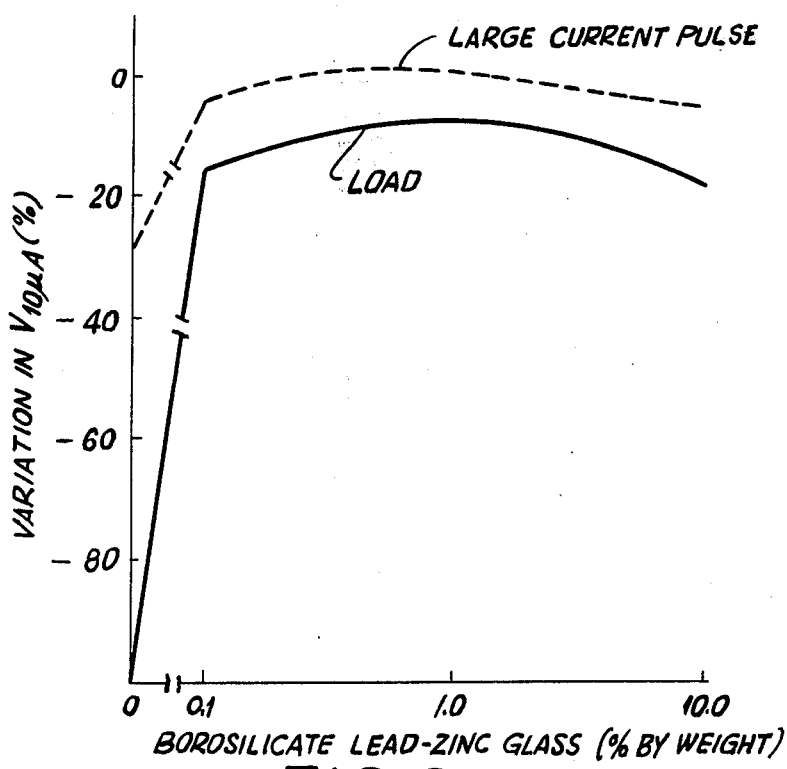

FIG. 2 shows the voltage nonlinear exponent α, breakdown voltage $V_{1mA}$, dielectric constant ε, and loss factor (tanδ) versus the amount of the borosilicate lead-zinc glass as exemplified by samples Nos. 232 and 1–6. FIG. 3 illustrates the load and the large current pulse characteristics versus similar amount of the borosilicate lead-zinc glass.

Figure 5:
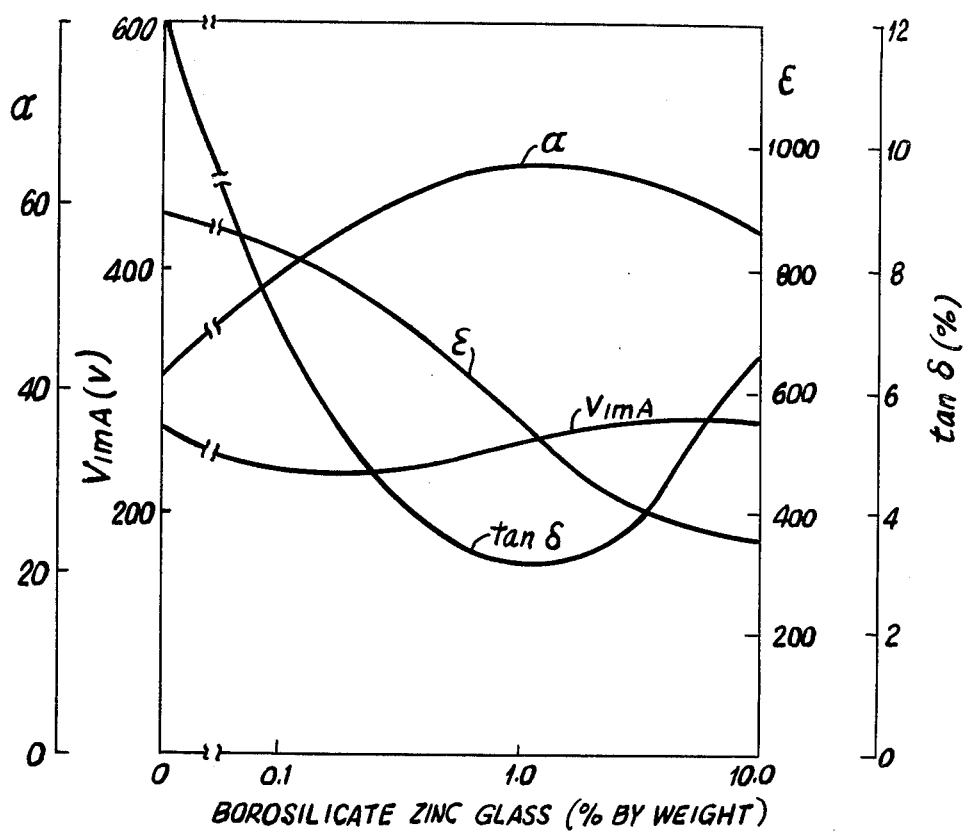
Figure 6:
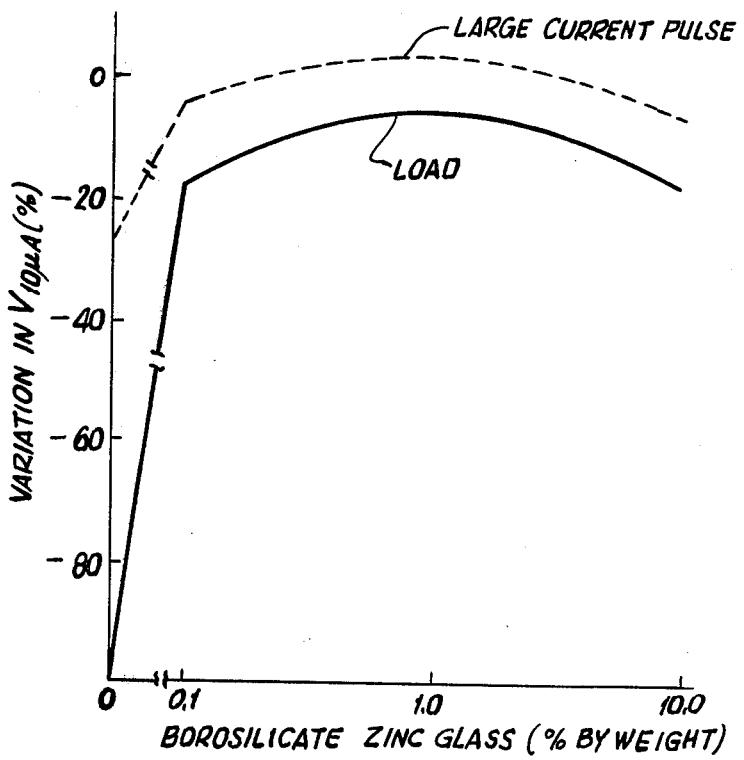

Turning now to FIG. 4, the current-voltage characteristic of sample No. 62 is also excellent like the sample No. 2. FIGS. 5 and 6 are similar to FIGS. 2 and 3 except that samples are Nos. 232 and 61-64.

Figure 8:
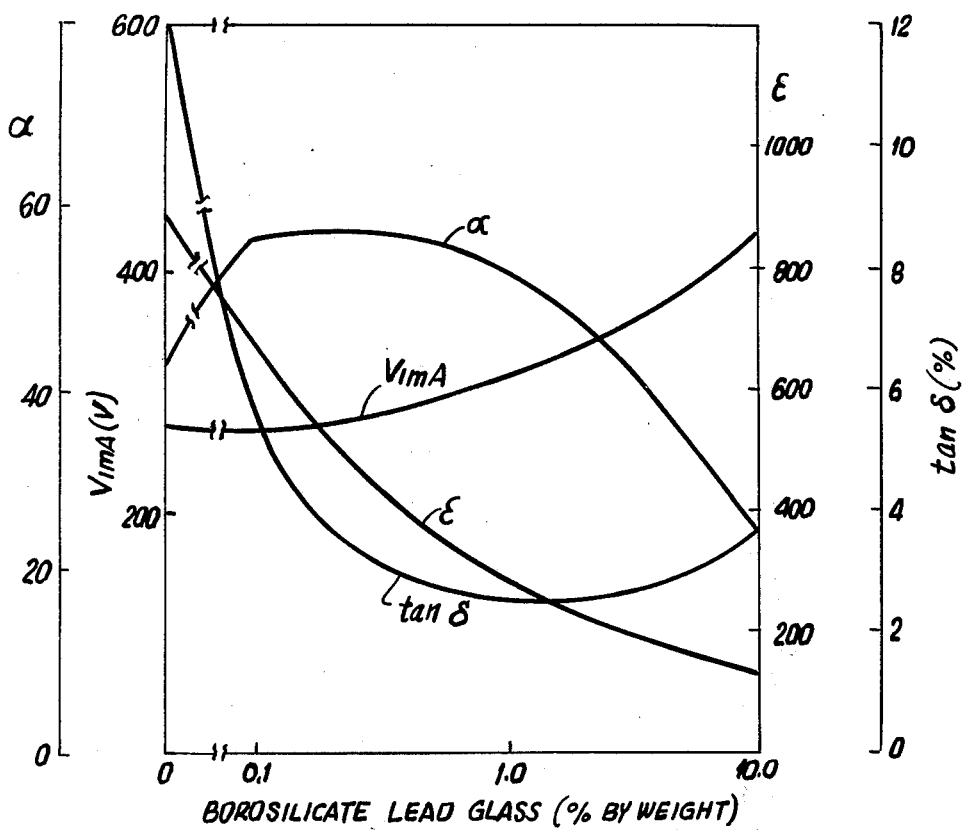
Figure 9:
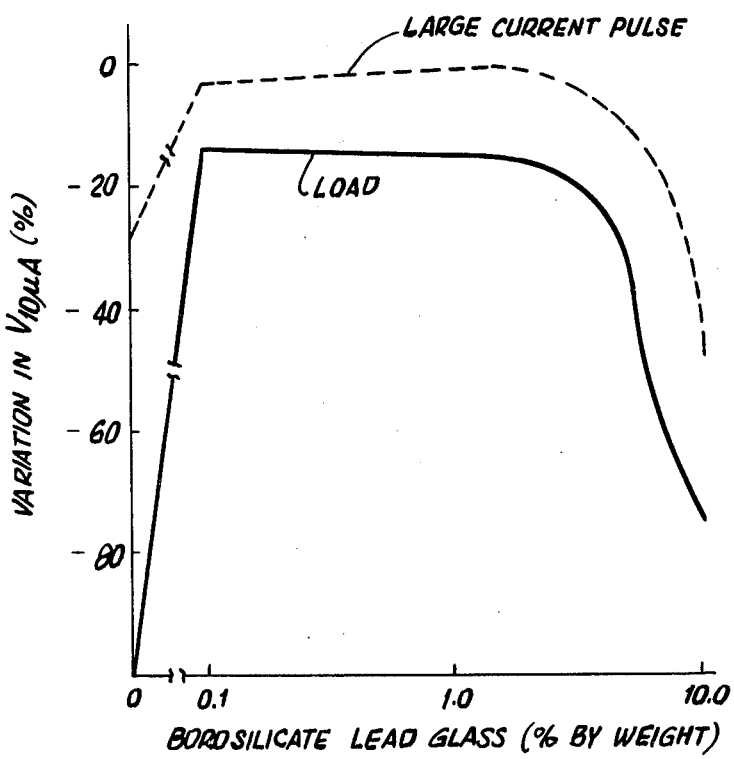

FIG. 7 shows the excellent current-voltage characteristic of sample No. 106. FIGS. 8 and 9 are similar to FIGS. 2 and 3 except that samples are Nos. 232 and 106-110.

Figure 11:
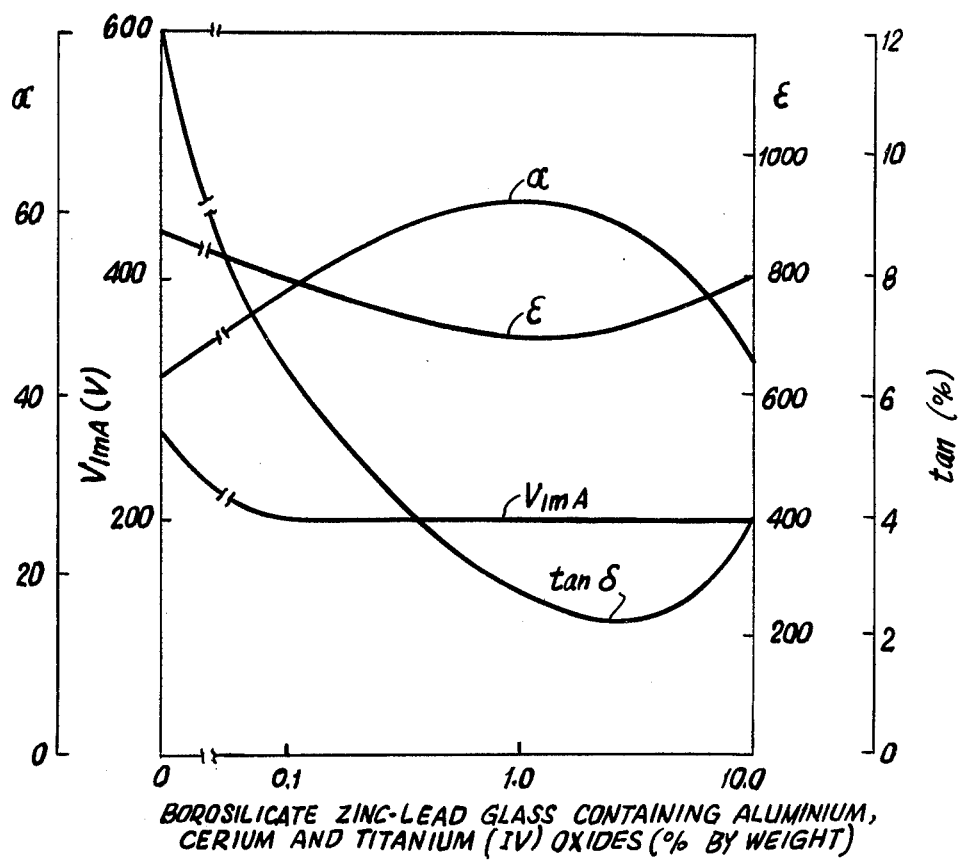
Figure 12:
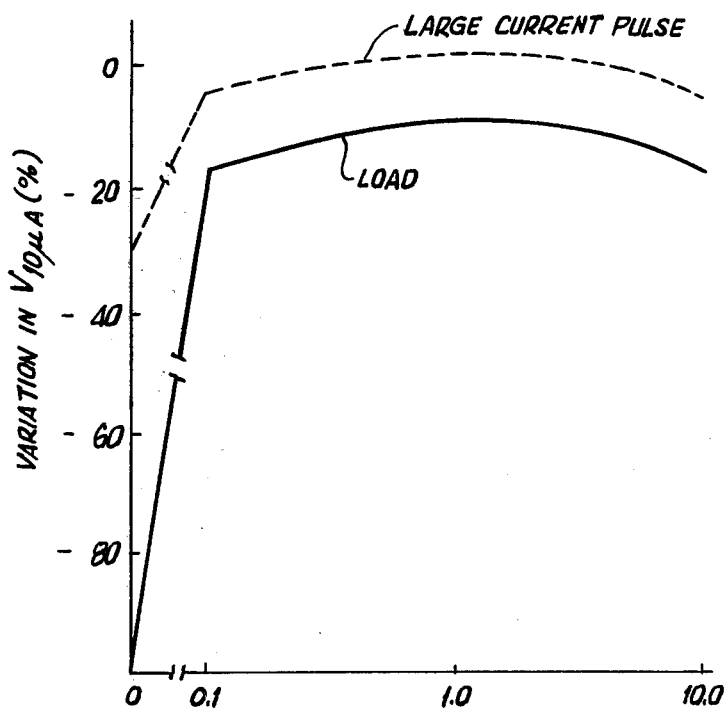

FIG. 10 again shows the excellent current-voltage characteristic of sample No. 159. FIGS. 11 and 12 are similar to FIGS. 2 and 3 except that samples are Nos. 158-161.

It is obvious from Table 4 that the excellent characteristics are obtained by simultaneous addition to the main component of the above-mentioned auxiliary and additional components. Furthermore, it has been confirmed that the additional components, namely, the borosilicate glass and/or its equivalent, may be added to the calcined main and auxiliary components throughout the first through fifth embodiments and that use may be made as the starting materials of carbonates and/or oxalates which become oxides when sintered. The fifth embodiment proves that substitution for the borosilicate lead and/or zinc glass of the additional components corresponding to the glass gives the excellent results. The ranges of the components of the first through fifth embodiments are determined to give the voltage nonlinear exponent α of 30 or more, the breakdown voltage $V_i$ of 500 volts or less, the dielectric constant ε of about 1000 or less, the loss factor (tanδ) of less than 10%, the above-mentioned load characteristics of about 20% or less, and the above-described large current pulse characteristics of about 5% or less. Close inspection of Table 4 will reveal from samples Nos. 34, 44, 49, 54, and 60 that the nonohmic ceramics according to the first embodiment should include 0.1-5.0%, 0.1-3.0%, 0.1-1.0%, and about 0.1% by weight of the borosilicate lead-zinc glass when the glass frit contains silicon(IV) oxide of about 70% and zinc and lead(II) oxides of about 7% in sum, when the glass first includes the silicon oxide of about 10-30% and the zinc and lead oxides of about 65% in sum, when the glass frit contains the silicon oxide of only about 2% and the lead oxide of about 75%, and the glass frit contains a still smaller amount of about 0.1% of the silicon oxide and the zinc and lead oxides of about 45% in sum, respectively, the percentages of the silicon, zinc, and lead oxides being by weight.

What is claimed is:

1. A nonohmic ceramic material having a voltage nonlinear exponent of at least 30, a dielectric constant of at most about 1000 at 1 KHz, a loss factor of less than 10% at 1 KHz, a breakdown voltage of at most about 500 volts, a load characteristic of at most about 20%, and a current pulse characteristic of at most about 5%, said load characteristic being evaluated by a change in the breakdown voltage for a current of 10 μA at room temperature before and after a power of 1.5 W/cm² is imposed for three hours on a 1-mm thick piece of said ceramic material kept at about 80° C., said current pulse characteristic being evaluated by a variation in the breakdown voltage before and after current pulses of 200 amperes are caused to flow through a 1-mm thick piece of said ceramic material, said current pulses having a wave-form of 10×200 microseconds, said ceramic material consisting essentially of a main component of zinc oxide, auxiliary components of bismuth (III) oxide of 0.1-10%, cobalt (II) oxide of 0.05-10%, manganese (II) oxide of 0.25-4%, and antimony (III) oxide of 0.05-6%, the percentages being by mol, and borosilicate lead-zinc glass of 0.1-10% by weight.

2. The nonohmic ceramic material as claimed in claim 1, wherein said borosilicate lead-zinc glass consists essentially of silicon (IV) oxide of 9.5-10.8%, boron oxide of 27.0-27.2%, zinc oxide of 60.0-63.4%, and lead (II) oxide of 0.1-2.0%, the percentages of the oxides of said glass being by weight.

3. The nonohmic ceramic material as claimed in claim 1, wherein said borosilicate lead-zinc glass consists essentially of silicon (IV) oxide of about 72%, boron oxide of about 21%, zinc oxide of about 0.1%, and lead (II) oxide of about 7%, the percentages of the oxides of said glass being by weight, said ceramic material including said glass in an amount of 0.1-5.0% by weight of said ceramic material.

4. A nonohmic ceramic material as claimed in claim 1, wherein said borosilicate lead-zinc glass consists essentially of silicon (IV) oxide of 12.0-27.0%, boron oxide of 8.0-23.5%, zinc oxide of 0.1-56%, and lead (II) oxide of 0.1-64.9%, the percentages of the oxides of said glass being by weight, said ceramic material including said glass in an amount of 0.1-3.0% by weight of said ceramic material.

5. The nonohmic ceramic material as claimed in claim 1, wherein said borosilicate lead-zinc glass consists essentially of silicon (IV) oxide of about 2%, boron oxide of about 10%, zinc oxide of about 12.5%, and lead (II) oxide of about 75.5%, the percentages of the oxides of said glass being by weight, said ceramic material including said glass in an amount of 0.1-1.0% by weight of said ceramic material.

6. The nonohmic ceramic material as claimed in claim 1, wherein said borosilicate lead-zinc glass consists essentially of silicon (IV) oxide of about 0.1%, boron oxide of about 55.4%, zinc oxide of about 44.4%, and lead (II) oxide of about 0.1%, the percentages of the oxides of said glass being by weight, said ceramic material including said glass in an amount of 0.1-1.0% by weight of said ceramic material.

7. A nonohmic ceramic material having a voltage nonlinear exponent of at least 30, a dielectric constant of at most about 1000 at 1 KHz, a loss factor of less than 10% at 1 KHz, a breakdown voltage of at most about 500 volts, a load characteristic of at most about 20%, and a current pulse characteristic of at most about 5%, said load characteristic being evaluated by a change in the breakdown voltage for a current of 10 μA at room temperature before and after a power of 1.5 W/cm² is imposed for three hours on a 1-mm thick piece of said ceramic material kept at about 80° C., said current pulse characteristic being evaluated by a variation in the breakdown voltage before and after current pulses of 200 amperes are caused to flow through a 1-mm thick piece of said ceramic material, said current pulses having a wave-form of 10×200 microseconds, said ceramic material consisting essentially of a main component of zinc oxide, auxiliary components of bismuth (III) oxide of 0.1-6%, cobalt (II) oxide of 0.05-10%, manganese (II) oxide of 0.25-4%, and antimony (III) oxide of 0.05-6%, the percentages of said auxiliary components being by mol, and borosilicate lead glass in said ceramic material of 0.1-3% by weight.

8. The nonohmic ceramic material as claimed in claim 7, wherein said borosilicate lead glass consists essentially of silicon (IV) oxide of 26-75%, boron oxide of 8-28%, and lead (II) oxide of 10-66%, the percentages of the oxides of said glass being by weight.

9. A nonohmic ceramic material produced by the steps of mixing starting materials to provide a mixture and calcining said mixture at a temperature between about 650° C. and 850° C., said starting materials consisting essentially of a main component of zinc oxide, auxiliary components of bismuth (III) oxide of 0.1-10%, cobalt oxide (II) of 0.05-10%, manganese (II) oxide of 0.25-4%, and antimony (III) oxide of 0.05-6%, the percentages being by mol, and as an additional components borosilicate lead-zinc glass frit of 0.1-10% by weight.

10. The nonohmic ceramic material as claimed in claim 9, wherein said borosilicate lead-zinc glass frit consists essentially of silicon (IV) oxide of 9.5-10.8%, boron oxide of 27.0-27.2%, zinc oxide of 60.0-63.4%, and lead (II) oxide of 0.1-2.0%, the percentages of the oxides of said glass frit being by weight.

11. The nonohmic ceramic material as claimed in claim 9, wherein said borosilicate lead-zinc glass frit consists essentially of silicon (IV) oxide of about 72%, boron oxide of about 21%, zinc oxide of about 0.1%, and lead (II) oxide of about 7%, the percentages of the oxides of said glass frit being by weight, said starting materials including said borosilicate lead-zinc glass frit in an amount of 0.1-5.0% by weight of said ceramic material.

12. The nonohmic ceramic material as claimed in claim 9, wherein said borosilicate lead-zinc glass frit consists essentially of silicon (IV) oxide of 12.0-27.0%, boron oxide of 8.0-23.5%, zinc oxide of 0.1-56%, and lead (II) oxide of 0.1-64.9%, the percentages of the oxides of said glass frit being by weight, said starting materials including said borosilicate lead-zinc glass frit in an amount of 0.1-3.0% by weight of said ceramic material.

13. The nonohmic ceramic material as claimed in claim 9, wherein said borosilicate lead-zinc glass frit consists essentially of silicon (IV) oxide of about 2%, boron oxide of about 10%, zinc oxide of about 12.5%, and lead (II) oxide of about 75.5%, the percentages of the oxides of said glass frit being by weight, said starting materials including said borosilicate lead-zinc glass frit in an amount of 0.1-1.0% by weight of said ceramic material.

14. The nonohmic ceramic material as claimed in claim 9, wherein said borosilicate lead-zinc glass frit consists essentially of silicon (IV) oxide of about 0.1%, boron oxide of about 55.4%, zinc oxide of about 44.4%, and lead (II) oxide of about 0.1%, the percentages of the oxides of said glass frit being by weight, said starting materials including said borosilicate lead-zinc glass frit in an amount of 0.1-1.0% by weight of said ceramic material.

15. A nonohmic ceramic material produced by the steps of mixing starting materials to provide a mixture and calcining said mixture at a temperature between about 650° C. and 850° C., said starting materials consisting essentially of a main component of zinc oxide, auxiliary components of bismuth (III) oxide of 0.1-6%, cobalt (II) oxide of 0.05-10%, manganese (II) oxide of 0.25-4%, and antimony (III) oxide of 0.05-6%, the percentages of said auxiliary components being by mol, and additional components of borosilicate lead glass frit is said ceramic material of 0.1-3% by weight.

16. The nonohmic ceramic material as claimed in claim 15, wherein said borosilicate lead glass frit consists essentially of silicon (IV) oxide of 26-75%, boron oxide of 8-28%, and lead (II) oxide of 10-66%, the percentages of the oxides of said glass frit being by weight.

* * * * *

UNITED STATES PATENT OFFICE
CERTIFICATE OF CORRECTION

Patent No. 4,147,670  Dated April 3, 1979

Inventor(s) Nobuaki Shohata et al

It is certified that error appears in the above-identified patent and that said Letters Patent are hereby corrected as shown below:

On the first page of the patent, the assignees in accordance with the recorded assignment should be indicated as follows:

--Nippon Electric Co., Ltd., Tokyo, Japan, and Ohizumi Mfg. Co., Ltd., Tokyo, Japan.--

In The Abstract

In the table, MnO for composition No. 3 should be --0.25-4--; MnO for composition No. 4 should be --0.25-10--.

Claims 1 and 7, the expression "KHz" should read --kHz--.

Claim 15, line 30, "additional components of" should be --as an additional component--.

Signed and Sealed this

Twenty-sixth Day of February 1980

[SEAL]

Attest:

SIDNEY A. DIAMOND

Attesting Officer  Commissioner of Patents and Trademarks